United States Patent

Duval et al.

[15] 3,701,853

[45] Oct. 31, 1972

[54] SELECTION SYSTEMS FOR ELECTRICAL CIRCUITS OR EQUIPMENTS

[72] Inventors: Georges A. Duval, Fresnes; Francois Hernandez, Epinay-sur-Seine, both of France

[73] Assignee: International Standard Electric Corporation, New York, N.Y.

[22] Filed: Feb. 27, 1970

[21] Appl. No.: 15,161

[30] Foreign Application Priority Data

March 28, 1969 France......................6909285

[52] U.S. Cl...........................179/18 HA, 179/18 EA
[51] Int. Cl................................................H04q 3/62
[58] Field of Search.................................179/18 HA

[56] References Cited

UNITED STATES PATENTS 3,519,755 7/1970 Allum et al. ..........179/18 HA
3,536,844 10/1970 Anderson.............179/18 HA

*Primary Examiner*—William C. Cooper
*Attorney*—C. Cornell Remsen, Jr., Walter J. Baum, Percy P. Lantzy, J. Warren Whitesel, Delbert P. Warner and James B. Raden

[57] ABSTRACT

Selection system applicable, namely, in telephone exchanges for the calls to subscriber lines grouped under a same number.

It enables selecting a free line (1*g*) out of a group of lines with the purpose of connecting it to a common unit (AL) through a connecting network (RC). A device (MA) designates the lines in the called group. A circuit (CSI) selects one free line out of the designated lines, according to an order of priority provided by a distributing circuit (CDM). Renewing means enable selecting another line when the connection does not take place, in case of congestion. The circuit (CDM) then gives highest priority to the line immediately following the one unable to be connected to.

5 Claims, 4 Drawing Figures

PATENTED OCT 31 1972

3,701,853

Figure 1:
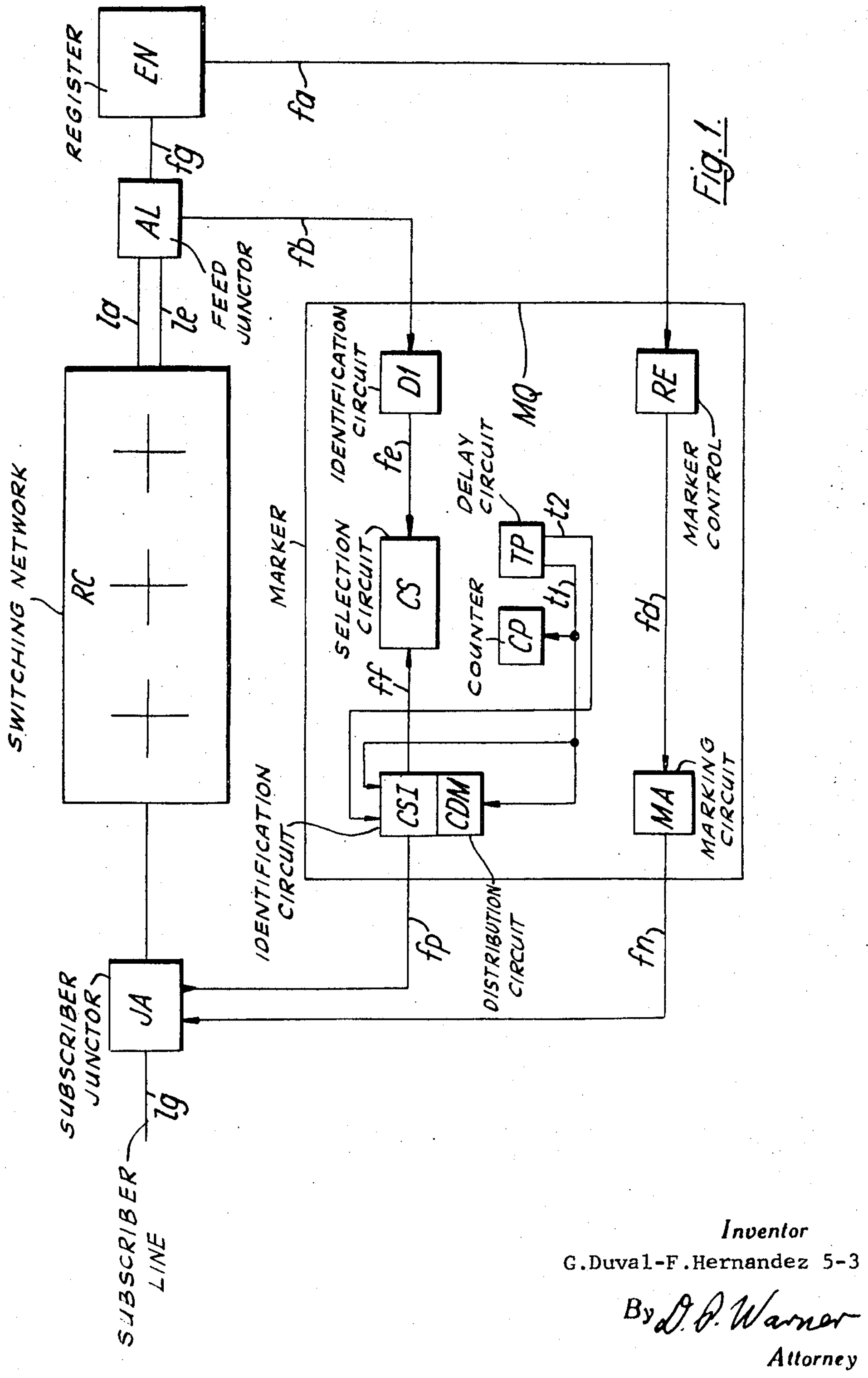

*Inventor*
G.Duval-F.Hernandez 5-3

By D. P. Warner
*Attorney*

SELECTION SYSTEMS FOR ELECTRICAL CIRCUITS OR EQUIPMENTS

The present invention concerns improvements in selection systems for electrical circuits or equipment and, more particularly, a selection system making it possible to connect a common equipment to an individual equipment chosen among several, through a multi-stage switching network. Such a system is applicable, in particular, though not exclusively, in automatic telephone exchanges for calling subscriber lines grouped under a same number.

When a subscriber, such as a private firm for example, owns several lines, a simple solution consists in assigning a number to each line. In this case, to call this subscriber, a calling subscriber dials the number of one of the lines chosen at random. If this line is busy, he must call another line as many times as it is necessary until he founds a free line. To avoid this drawback, it is well-known to group all the subscriber's lines under the same call-number. In this way, to be connected to one among the free lines, the calling subscriber merely dials the group number. In the exchange, a selection system is thus necessary to identify the lines of the group, to select the free ones and choose one which can be connected to the calling subscriber's line.

In systems using a multi-stage crossbar switching network and having a piloting network, the very nature of the piloting network makes it possible, when free lines of a group have been marked, to select a connection path leading to one of the marked lines. However, a problem is raised in the systems which have not such a piloting network such as the one described in the French Pat. No. 1,501,025 filed on Sept. 16, 1966 by F. Navarre (2—2) and entitled "Improvements to selection systems for electrical circuits or equipments" and in the U.S. patent application No. 820,413 filed on April (4-3) 1969 by Duval et al. (4-3), now U.S. Pat. No. 3,626,111, issued Dec. 7, 1971 and entitled "-Selection system for electrical circuits or equipments." Indeed, this system only enables the selection of a path between a determined inlet and a determined outlet of the switching network. The above-mentioned French Pat. No. 1,501,025 concerns the selection of a connection path between an identified calling subscriber line (connected to one outlet of the switching network) and a free common equipment (connected to one inlet). The previously mentioned U.S. patent application concerns the selection of a connection path between a common equipment (connected to one inlet of the switching network) and a called subscriber line (connected to one outlet) designated by its number.

The present invention concerns improvements to the system disclosed in cited documents, which enables the selection of a connection path between one among several lines and a common equipment. It provides the selection of a free line of a called group, then the selection of a connection path between said line and a common equipment. In the case when no connection path between the line selected in the called group and the common equipment is available, the invention provides arrangements for selecting another free line of the group and the selection of a connection path between this new line and the common equipment, etc.

The invention also provides arrangements for connecting the common equipment to a busy line of the group in the case when all the lines are busy. This facility will be offered only to calls originated from a limited number of stations called priority stations.

Such a system facilitates the traffic handling towards grouped lines by giving each call the possibility of reaching the required subscriber.

Figure 2:
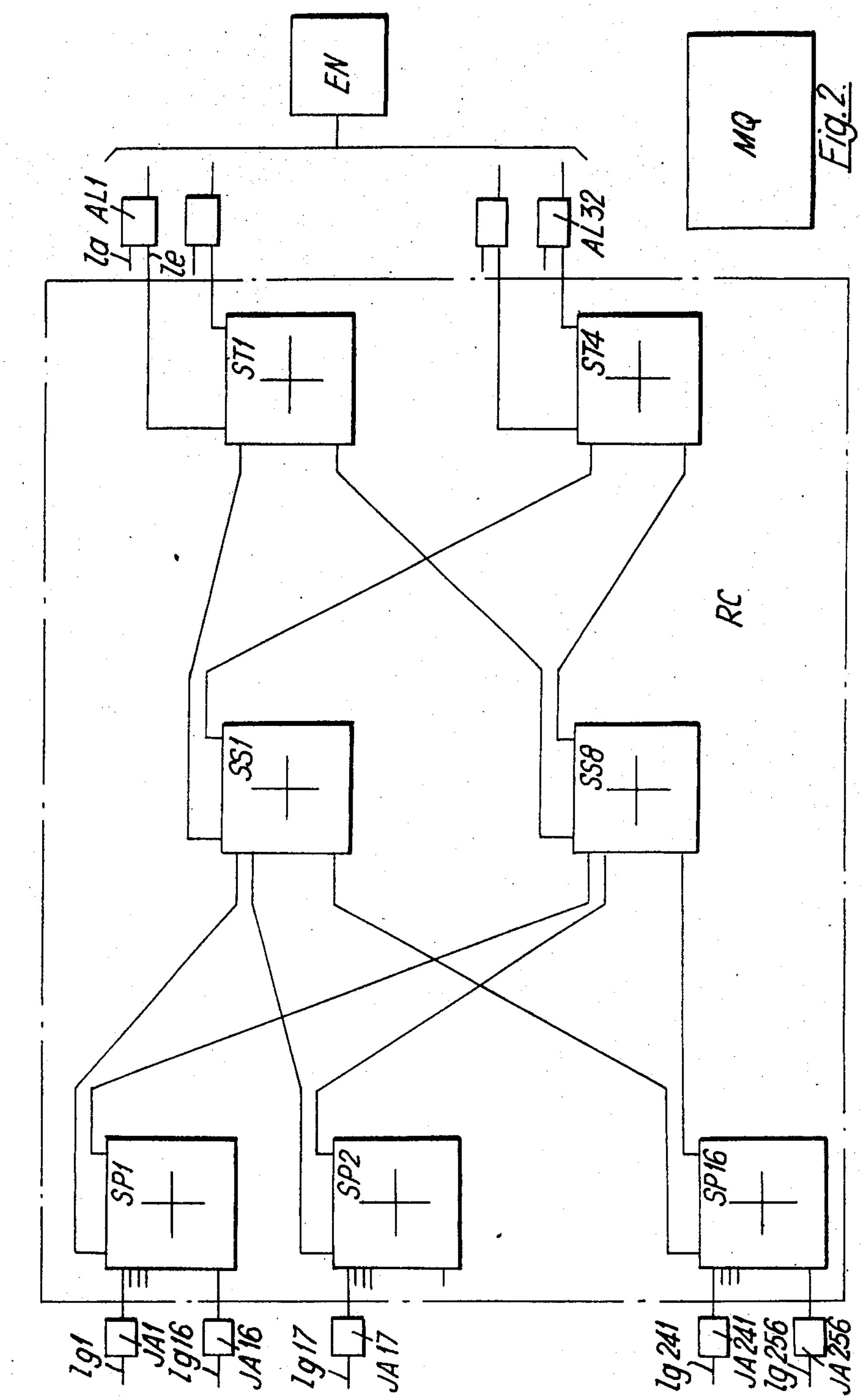
Figure 3:
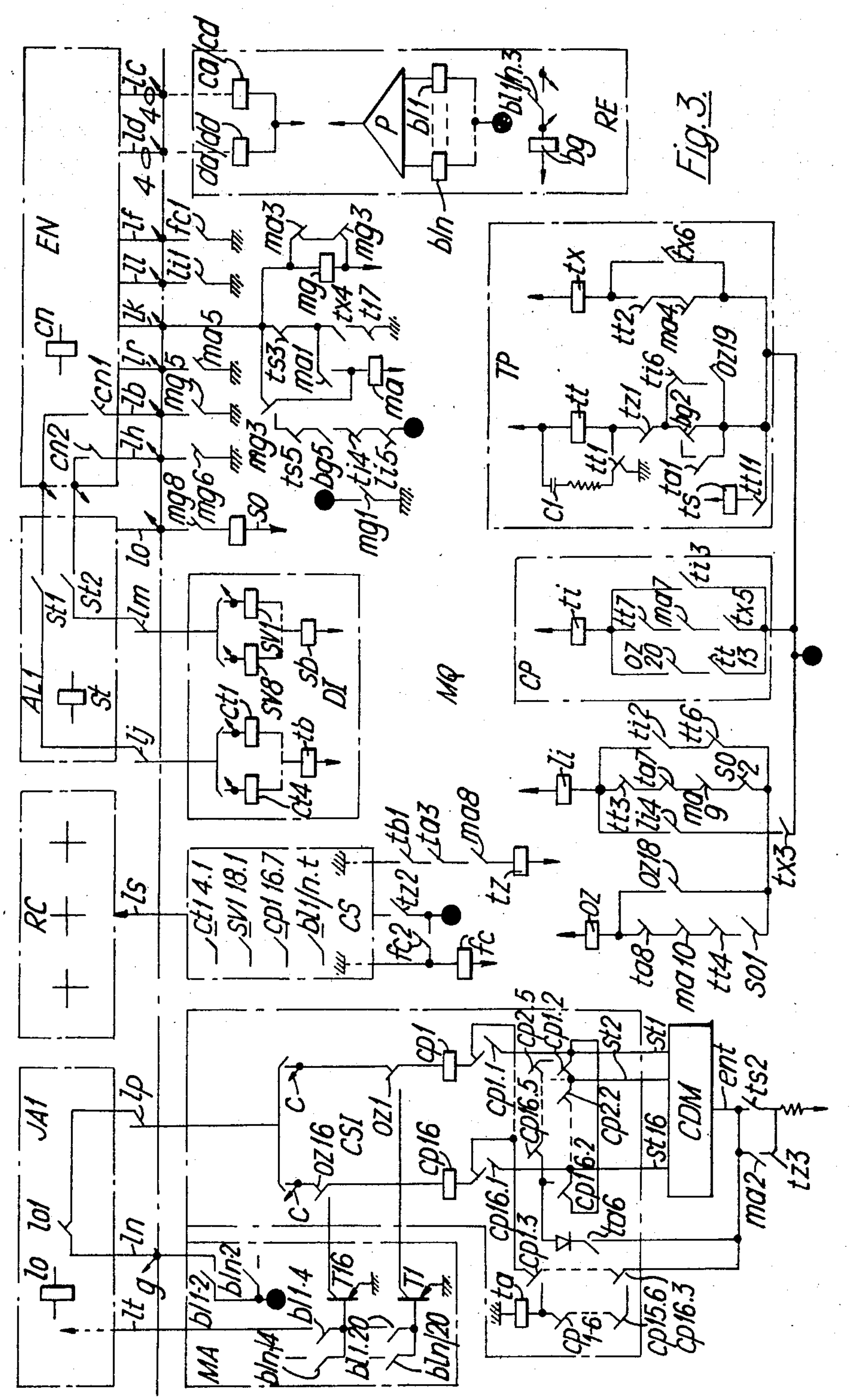
Figure 4:
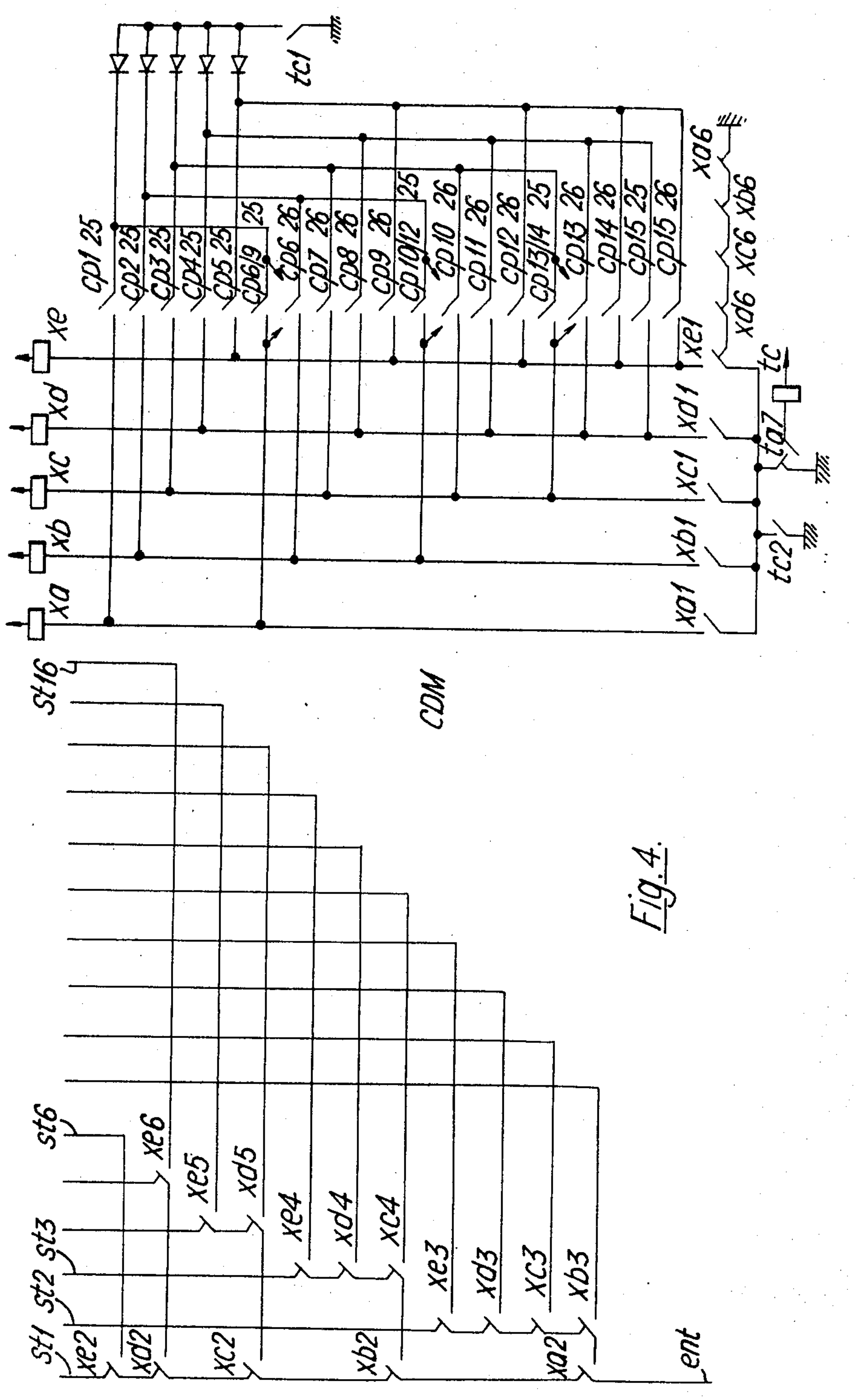

Various other features of the invention will be disclosed from the following description given by way of non-limited example referring to the accompanying drawings which represent:

FIG. 1, the block diagram of an embodiment of the invention;

FIG. 2, the connection diagram of a switching network of a telephone exchange to which may be applied the principle of the invention;

FIG. 3, the detailed diagram of the marker circuits used for operating the selection system, according to the invention;

FIG. 4, the detailed diagram of a distribution circuit used in the scope of the invention.

Now will be described referring to FIG. 1, the block diagram of an embodiment of the invention.

This system includes subscribers' lines, such as **1*g***, each terminated by an individual equipment, such as JA called subscriber's junctor. The subscriber's junctor JA may assume one of five distinct conditions as follows: (1) the line lg is free, (2) in first degree busy condition, (3) in second degree busy condition, (4) in calling condition or (5) in permanent loop condition. A line is in first degree busy condition, when it is connected to another subscriber's line. A line is in second degree busy condition when it is connected to one subscriber's line and that another line is connected to it (as a third party). Thus, a line in first degree busy condition is accessible to certain classes of calls operator calls, for example) and may be accessed by a third party. It then passes to second degree busy condition and becomes inaccessible.

In the scope of the invention, the function of the subscriber's junctor JA is when receiving a marking signal on the wire *fn* from a common unit MQ called marker to transmit on the connection *fp* either an availability signal if the line *lg* is free or a busy signal if it is in first degree busy condition.

The subscribers' junctors are connected to the outlets of a switching network RC including several selection stages (three, for example).

It will be assumed that at least there exists a group of lines, all designated by the same number. To reach any line of the group, a calling subscriber merely dials the number of this group.

Common units, such as AL, called feed-junctors are connected to the inlets of the switching network RC. A feed-junctor, in particular, supplies current for the calling and called lines. When a call is established, the calling subscriber's line is connected to one among the accesses *la*, called "calling-line access," of a feed-junctor, then the called subscriber's line is connected to the other access *le*, called "called-line access" of the same feed-junctor. To enable such operations, the feed-junctor has access to the marker by the connection *fb* in order to send its identity to it. In other respects, the feed-junctor may be connected, through the connection *fg* to a common unit, such as EN, called register, whose function is mainly to receive the digits of the called subscriber number and to transmit this number to the marker MQ through the connection *fa*.

In the marker MQ, a device RE receives through the connection *fa*, the number of a called line, or, in the scope of the invention, the number of a called group of lines supplied by the register EN. A marking device MA marks all the group lines whose identity is supplied by the device RE. A choice and identification circuit CSI selects a line among those which, as free, supply an availability signal on the connection *fp* proper to them. This selection gives the identity of the switching network outlet to which this line is connected. Associated with the circuit CSI, a distribution circuit CDM periodically changes position and makes it possible to give a variable priority to the various lines of the group. Besides, an identification circuit DI identifies through the connection *fb*, the switching network inlet to which is connected the called-line access of the feed-junctor which must be connected to one line of the called group. A selection circuit CS receives, through the connections *fe* and *ff* respectively, the identities of one inlet and one outlet of the switching network RC and selects through the connection *fs* a connection path between this inlet and this outlet, and controls the connections.

Finally, a delay device TP is operated at the beginning of the selection of a connection path between the selected line and the feed-junctor, in order to determine the maximum time *t*1 devoted to this selection. It supplies a control signal *t*1 if no connection path has been found at the end of this duration. The delay device TP is also operated during the marking leading to the selection of a free line of the group, in order to measure the maximum time *t*2 devoted to this process. It supplies a control signal *t*2 if no line of the group is found free at the end of this duration.

Moreover, the system according to the invention, enables the renewal of a free line selection, in the case when no connection path is available between the selected line and the feed-junctor. A counter CP counts the number of renewals in order to control the sending of a busy signal to the calling line when its reaches a determined position.

Now will be assumed that a calling line has been connected to the access *la* of the feed-junctor AL and that the subscriber has just dialled the number of a group of lines. The register EN has registered this number. It calls the marker MQ. When the latter is seized, the register sends to the device RE the number of the called group.

Under the control of the device RE, the marking device MA marks all the lines of the called group. The subscribers' junctors corresponding to free lines send, in return, the availability signal on the connection *fp* proper to them, towards the choice and identification circuit CSI. The circuit CSI influenced by the distribution circuit CDM selects the free line to which the latter assigns the highest priority. Under the control of the circuit CSI, the circuit CDM is positioned in order that it assigns the lowest priority to the line previously selected in order that in the case of selection renewal, another line be preferably selected.

The device DI receives from the feed-junctor AL, on the wire *fb*, an item of information enabling the identification of the inlet of the switching network RC to which it is connected.

The circuit CS receives from the circuit CSI, through the connection *ff*, the identity of the selected outlet and, from the device DI, through the connection *fe*, the identity of the inlet. The circuit CS selects, through the connection *fs*, a connection path between the inlet and the outlet, through the switching network RC and orders the connections necessary to the establishment of the connection path. The marker MQ further releases and controls the release of the register EN.

If the selection of a connection path between the selected line and the feed-junctor AL does not succeed, due to a congestion in the switching network RC, the delay device TP delivers, at the end of the time *t*1 devoted to this selection, the control signal *t*1 which controls the restoring to normal of the circuit CSI. The previous selection is cancelled and the selection of a free line of the called group is again undertaken. The circuit CDM, having changed position during the preceding selection now assigns the lowest priority to the line previously selected, in order to select preferably another line, and avoid meeting with the same congestion. The device MA marks all the lines of the group. Those which are free retransmit this marking towards the circuit CSI. The latter selects the one to which the circuit CDM assigns the highest priority. The selection of a connection path between the selected line and the feed-junctor AL is carried out as previously.

Moreover, the signal *t*1 causes counter CP to step once at each renewal. Counter CP thus indicates the number of renewals carried out. When it reaches a determined position and that no connection path exists between the selected line and the feed-junctor AL, it controls the sending of a busy signal to the calling line. This sending my occur, for example, further to one single unsuccessful renewal.

Now will be considered the case when all the lines of the called group are busy.

The delay device TP, operated at the start of selection of a line of the called group, delivers, at the end of the time *t*2 devoted to this selection, the control signal *t*2.

If the calling station is a priority station, that is, if it has the possibility of being connected to a line in first degree busy condition, the circuit CSI becomes sensitive, by the signal *t*2, to the busy signal delivered by the junctors which correspond to lines in first degree busy condition, on the connection *fp* proper to them. The circuit CSI selects the one to which the circuit CDM assigns the highest priority. The case is then the same as previously seen, in which a line having been selected, a connection path must be found between said line and the feed-junctor AL.

If the calling station is not a priority one, the signal *t*2 controls the sending of a busy signal, the release of the register EN and of the marker MQ.

Referring to FIG. 2, now will be described the connection of a telephone exchange in which may be applied the principle of the invention. This exchange handles 256 lines *lg*1 to *lg*256, each respectively terminated by the subscribers' junctors JA1 to JA256. The subscribers' lines are distributed into 16 groups of 16 lines, such as *lg*1 to *lg*16, on the outlets of 16 primary sections SP1 to SP16 of the switching network RC. These sections may be each constituted by a crossbar multiswitch having 16 outlets and 8 inlets.

The switching network RC also includes 8 secondary sections SS1 to SS8 and 4 tertiary sections ST1 to ST4. These sections may be also constituted by crossbar multiswitches.

Each primary section is connected by one single link, called primary link, to each secondary section. Similarly, each secondary section is connected by one single link, called secondary link to each tertiary section. Thus, between one primary secton and the secondary stage, there exists as many links as there are secondary sections. Between a tertiary section and the secondary stage, there exists as many links as there are secondary sections. Thus, between a primary section and a tertiary section, there exists as many paths as there are secondary sections.

At the inlets of the tertiary stage are connected feed-junctors, such as AL1 to AL32. Each feed-junctor has two accesses, one access *la*, called "calling-line access" for the calling line connection and one access *le*, called "called-line access" for the called line connection. The invention only concerns the connections established through the access *le*. That is why the access *la* is not connected on the FIG. 2. Each feed-junctor has also access to registers such as EN.

Besides, it will be assumed that the lines which occupy the outlets of rank 1 in each primary section, such as the line *lg*1 for the section SP1, the line *lg*17 for the section SP2 and the line *lg*256 for the section SP16 are grouped under the same call number.

As the different lines of the group occupy outlets of the same rank in the various sections, the identification of one line (*lg*1, for example) is carried out in a very simple way by identifying the rank of the outlet (common to all the group lines) and the section to which belongs the line (identity of the line in the group).

Besides as described with FIG. 1, the marker receives the feed-junctor identity, AL1 for example, to which the selected line must be connected. It thus knows the identity of the primary section (SP1) to which the selected line *lg*1 is connected and the identity of the tertiary section (ST1) to which is connected the access *le* of the feed-junctor AL1. Between the section SP1 and the section ST1, there exists as many paths as there are secondary sections. The marker then selects a connection path between the section SP1 and the section ST1 as described in the French patent application No. PV. 150,423, already quoted, and then controls the establishment of the selected connection path.

Referring to FIG. 3, now will be described an embodiment of the circuits operating the selection system, according to the invention.

In this figure are shown parts of the marker MQ, of a register EN, of a subscriber's line junctor JA1, of a feed-junctor AL1, necessary to the understanding of the invention. The network RC is symbolically represented as in FIG. 1.

The divisions inside the marker MQ, as defined in FIG. 1 (DI, RE, CS, MA, TP, CP, CSI and CDM) have been shown in order to facilitate the understanding of the description. It is to be noted that the time intervals *t*1 and *t*2 determined by the delay device TP, such as defined in the description of FIG. 1 will be supposed equal for simplification reasons.

The various circuits are composed of relays and contacts. A relay is represented by a rectangle bearing, on each side, the connections of a winding. It is referenced by two small letters followed by a number, in the case of homologous relays. According to the exploded representation, the contacts controlled by a relay are arranged anywhere in the figure. These contacts bear the relay reference followed by a number. Thus, the reference *lg* 1.2 designates the contact 2 of relay *lg*1. Finally, it is to be noted that the various circuits are current-fed by a same DC source, a battery, for example, whose positive pole is earthed. The circuits leading to the negative pole of this battery are terminated by an arrow.

It will be initially assumed that a calling line is connected to a feed-junctor, such as AL1 of FIG. 2 and that the latter is connected to a register such as EN. The relay *st* of the feed-junctor AL1 is energized. The marker is available and all its relays are at rest. The junctors JA1 to JA256 whose lines are free have their relays *lo* at rest. Therefore, they can retransmit on the wire *lp* a marking received on the wire *ln*, to indicate their availability. The junctors whose lines are in first degree busy condition, supply by non represented means, a negative polarity on a wire *lt* towards the device MA of the marker MQ.

The register EN has just received the number of a called group of lines. This group is constituted, for example, by 16 lines *lg*1, *lg*17. . . . *lg*241 (FIG. 2).

The register EN seizes the marker by applying an earth on the wire *lk*. This earth energizes the relay *ma* through the contact *mg*3. The relay *ma* holds by the contacts *ts*3 and *ma*1. The contact *ma*3 opens and the relay *mg* energizes on the earth of the wire *lk*. The contact *mg*1 closes and connects a general earth. To simplify the figure, the general earth circuit is represented by black circles; it will be understood that they are all directly interconnected.

The relay *tt* energizes through : battery, relay *tt*, contacts *tz*1, *bg*2 and earth. The capacitor *c*1 previously charged by the break contact *tt*1, is connected to relay *tt* by the make contact *tt*1 and remains charged. The relay *ts* energizes by the contact *tt*11. The contact *ts*3 opens and causes the release of relay *ma*. The relay *tx* energizes by the contacts *tt*2 and *ma*4 and holds by the contact *tx*6. The contact *ma*5 closes and applies an earth on the wire *lr* in order to indicate to the register EN that the marker MQ is seized and to control the connection of the register EN to the marker MQ. The relay *cn* energizes in the register EN through non-represented means.

The contacts *mg*5 and *mg*6 apply an earth on the wires *lb* and *lh* respectively. The earth of the wire *lb* is retransmitted by the contact *cn*1 of the register EN towards all feed-junctors (in particular to the feed-junctor AL1) which have access to the register EN. The feed-junctor AL1, which has its contact *st*1 closed retransmits this earth on a wire *lj* proper to it, towards one among the relays *ct*1 to *ct*4, which characterizes the tertiary section to which its called subscriber's access is connected. The relay *ct*1, for example, energizes which indicates that the first section is concerned. The relay *tb* energizes in series with the relay *ct*1. The earth of the wire *lh* is retransmitted, in the same way, by the contact *cn*2 of the register EN and by the contact *st*2 of the feed-junctor AL1 on the wire *lm*, towards one of the relays *sv*1 to *sv*8. The relay *sv*1, for example, energizes, thus indicating the identity of the inlet inside the tertiary section previously identified, to which is connected the called subscriber's access of the feed-junctor AL1. The relay *sb* energizes in series with the relay *sv*1.

Moreover, if the calling station is a priority station, the feed-junctor applies an earth on the wire *lo*. The relay so energizes through the contact *mg*8.

The relay *cn* being energized, the register EN sends to the marker MQ the called group number. This transmission is carried out in an appropriate code, for example, in binary code, which necessitates 4 transmission wires per digit. In the case of a 2 digit number, one digit is received on the relays *ca/cd*, through the wires *lc* and the other one, on the relays *da/dd*, through the wires *ld*. The contacts of the relays *ca/cd* and *da/dd* are arranged in the form of a decoding pyramid P, in order to decode the number of the called group of lines and to energize one of the *n* relays *bl*1 to *bln* according to the called group. According to the chosen example (group of lines *lg 1* . . . *lg*241) which corresponds to the first group, the corresponding relay *bl*1 energizes. The relay *bg* energizes by the contact *bl*1.3. As it has been described with FIG. 1, the various lines of the called group are distributed into different primary sections and occupy the same level in these sections. This level may thus be designated by the relay *bl*1.

The contact *bg*2 operates and breaks the energization circuit of the relay *tt*. However, as the contact *tt*1 is closed, this relay holds by capacitor c1 discharge current. The discharge time of capacitor *c*1 and thus the holding time of the relay *tt* determines the maximum time devoted to the selection of a free line of the called group.

The contact *bl*1.2 of the device MA applies an earth on the wire *ln*, towards all the junctors of the called group. Indeed, the arrow "*g*" indicates that there exists a multipling towards all the junctors belonging to the same group. The junctors corresponding to free lines have their contact *lo*1 closed. They retransmit this earth on the wire *lp* towards the relays *cp*1 to *cp*16. As indicated by the arrow "*c*" the circuit of each relay *cp*1 to *cp*16 is multipled towards all the junctors belonging to the same primary section. The relay *cp*1, for example, is multipled on all the junctors JA1 to JA16 (FIG. 2) belonging to the first primary section. The relay *cp*1 thus designates this primary section.

Besides, in series with the relays *cp*1 to *cp*16, the distribution circuit CDM makes it possible to assign a priority order in the case when several lines of the called group are free.

It will be assumed that the lines *lg*1 and *lg*241 of the called group are free. The line *lg*1 belongs to the primary section SP1 ; the earth supplied on the wire *ln* is thus retransmitted through the junctor JA1, towards the relay *cp*1 of the choice and identification circuit CSI. The line *lg*241 belongs to the primary section SP16 ; the earth supplied on the wire *ln* is thus retransmitted through the junctor JA16 (non-represented in FIG. 3) towards the relay *cp*16. The relay *cp*1 energizes through the following circuit : battery, resistor, contacts *ts*2, *cp*16.3 to *cp*1.3, *cp*1.1, relay *cp*1, contact *oz*1, wire *lp*, contact *lo*1 in the junctor JA1, wire *ln*, contact *bl*1.2 and earth. The relay *cp*16 also energizes through a similar circuit including the contacts *cp*16.1,*oz*16 and a contact *lo*1 of the non-represented junctor JA16. The contacts *cp*1.1 and *cp*16.1 operate and connect the corresponding relays to the inlets *st*1 and *st*16 of the circuit CDM.

The circuit CDM is a circuit connecting successively the input conductor *ent* to the output conductors *st*1 to *st*16. It periodically changes position and makes it possible to assign a variable priority to the 16 primary sections. Indeed, if it is assumed thaT the circuit CDM connects the input *ent* to the output *st*1, the relay *cp*1 founds a holding circuit through : battery, resistor, contact *ts*2, conductor *ent*, circuit CDM, conductor *st*1, contact *cp*1.1, relay *cp*1, contact *oz*1, wire *lp*, contact *lo*1, wire *ln*, contact *bl*1.2 and earth. The opening of the contact *cp*1.2 prevents the holding of the relay *cp*16 by the same circuit. The relay *cp*1 has priority. No other relay can hold. The relay *cp*16 releases. Moreover, the operation of the contact *cp*1.3 breaks the energization circuit of the relays *cp*1 to *cp*16. If the circuit CDM connects the conductor *ent* to the conductor *st*2, the relay *cp*16 holds and and the opening of its contact *cp*16.2 prevents the holding of the relay *cp*1.

As long as the relay *cp*16 has not released, the battery from the contact *ts*2 does not reach the relay *ta*, because *cp*1.6 is open. When the relay *cp*16 has released, the relay *ta* can energize through *cp*16.3 at rest and *cp*1.3 operated. The contacts *cp*/16.3, *cp*/15.6 . . . *cp*1.6 constitute a well-known chain called "one and one only". They cause the energization of the relay *ta* when only one of the relays *cp*1/16 is operated, that is, when the selection of a line of the group is achieved. In order that this choice be definitive and independent of the position of distributor CDM, the contact *ta*6 closes and enables the holding of the relay *cp*1 through : battery, resistor, contact *ts*2, contact *ta*6, decoupling diode, contacts *cp*16.5 to *cp*2.5 at rest, contact *cp*1.2 operated, contact *cp*1.1., relay *cp*1 winding, contacts *oz*1, wire *lp*, contact *lo*1, wire *ln*, contact *bl*1.2 and earth. The distributor CDM is shortcircuited. The contact *ta*1 closes and re-establishes the energization circuit of the relay *tt*.

The capacitor *c*1 charges anew. As it will be further seen, upon describing the circuit CDM represented in FIG. 4, the operation of the relay *ta* controls the positioning of the circuit CDM so that it assigns the lowest priority to the primary section SP1 which has just been selected. During the next selection, the section SP2 will thus have the highest priority. If this selection concerns the same group of lines, the line *lg*17 will thus have the highest priority and the line *lg*1 the lowest (see FIG.2).

Due to the fact that only the relay *cp*1 remains energized among the relays *cp*1 to *cp*16, the selected free line of the called group is the line *lg*1. The marker therefore knows the primary section (relay *cp*1) and the outlet inside this section (relay *bl*1) to which the selected line *lg*1 is connected. It also knows the tertiary section (relay *ct*1) and the inlet inside this section to which is connected the called line access le of the feed-junctor AL1 (relay *sv*1). These items of information are supplied to the selection circuit CS by the closure of the contacts *ct*1.1, *sv*1.1, *cp*1.7 and *bl*1.1.

The contacts *ma*8, *ta*3, *tb*1 are closed and apply an earth supplied by the circuit CS to the relay *tz*. The latter energizes. The contact *tz*1 opens and breaks the circuit of the relay *tt* which, nevertheless, holds by the discharge current of the capacitor *c*1. The contact *tz*2 closes and applies a general earth to the selection circuit CS.

The circuit CS, connected to the switching network RC by the connection *ls*, selects a connection path between the designated inlet and outlet. A system making it possible to select and then establish a connection path between a determined inlet and outlet of a switching network RC is disclosed in the French patent application No. PV. 150,423 above-quoted.

When a connection path has been selected, the circuit CS removes the earth from relay *tz* which releases. The contact *tz*1 closes and reestablishes the holding circuit of the relay *tt*.

The circuit CS controls the connections necessary to the establishment of the selected path. When the connections are effective, it sends an earth to the relay *fc* which energizes. The relay *fc* holds by its contact *fc*2. The contact *fc*1 closes and applies an earth on the wire *lf* towards the register EN in order to release the latter. The relay *cn* releases. The register EN removes the earth from the wire *lk*. The relay *mg* releases. The contact *mg*1 opens. The general earth of the marker MQ is removed. All the marker relays release ; the circuits restore to rest condition and the marker releases.

The system, according to the invention, thus makes it possible to select in a simple way a free line of a called group and to establish a connection path between this line and the calling line access of a feed-junctor.

Now will be considered the case when once a free line of the called group has been selected, no connection path between said line and the called line access is available. It will be seen that the system, according to the invention, enables the selection of another free line of the group in a simple and economic way.

The marker MQ is in the following condition : the relays *mg*, *tt*, *ts*, *tx*, *bl*1 and *bg* are energized, the number of the called group has been received from the register EN (the relays *bl*1 and bg are energized) ; the relays *ct*1 and *sv*1 characterizing the inlet to which is connected the called line access *le* of the feed-junctor are energized as well as the relays *tb* and *sb* ; the relay *cp*1 characterizing the primary section to which is connected a free line of the called group, as well as the relay *ta* are energized ; the circuit CDM assigns the lowest priority to the line selected by connecting the conductor *ent* to the conductor *st*2 ; however this circuit is shortcircuited by the contact *ta*6.

The relay *tz* energizes through : earth supplied by the circuit CS, contacts *tb*1, *ta*3 and *ma*8. The contact *tz*2 applies a general earth to the circuit CS. The contact *tz*1 breaks the energization circuit on the relay *tt*. The latter holds by the discharge current of capacitor *c*1. If no connection path is available, the relay *tz* does not release and the relay *tt* releases at the end of the discharge time of capacitor *c*1. The contact *tt*11 opens and controls the release of the relay *ts*. The capacitor *c*1 charges anew through the contact *tt*1.

The contact *ts*5 closes and controls the energization of the relay *ma*. The latter holds through *ma*1, *tx*4 and *ti*7. The opening of the contact *ts*2 breaks the energization circuit of the relays *cp*1 and *ta* which release. The contact *ta*6 opens ; the circuit CDM is de-shortcircuited. The contact *ta*3 opens and controls the release of the relay *tz*. The contact *tz*3 closes and re-establishes the energization circuit of the relays *cp*1 to *cp*16.

If it is assumed, as previously, that only the lines *lg*1 and *lg*241 are free in the called group, the relays *cp*1 and *cp*16 energize by the above-mentioned circuits. The relay *cp*16 holds through : battery, resistor, contacts *tz*3 and *ma*2, conductor *ent*, circuit CDM, conductor *st*2, contacts *cp*2.2 . . . contact *cp*16.1, relay *cp*16, contact *oz*16, wire *lp*, contact *lo*1, wire *ln*, contact *bl*1.2 and earth. The operation of the contact *cp*16.3 breaks the energization circuit of the relays *cp*1 to *cp*16. The operation of the contacts *cp*1.2 and *cp*16.5 prevents the holding of the relay *cp*1 by the same circuit. The relay *cp*1 releases. The relay *ta* energizes as previously seen. Due to the fact that only the relay *cp*16 remains energized among the relays *cp*1 to *cp*16, the free line selected in the called group is the line *lg*241. It can thus be seen that the circuit CDM has assigned the lowest priority to the line *lg*1, so that the first following free line, *lg*241 has been selected. The contact *ta*6 shortcircuits the circuit CDM. As previously seen, the circuit CDM, under the control of the relay *ta* changes position in order to assign the lowest priority to the relay *cp*16, that is to the line *lg*241, during the next selection. The contact *ta*1 closes, the relay *tt* energizes afresh. The relay *ts* energizes through the contact *tt*11 and the relay *ti* of the counter CP energizes through the contacts *tt*7, *ma*7 and *tx*5. The relay *ti* holds by its contact *ti*3. This relay serves to register the fact that a selection renewal has been taken place. The contact *ti*7 opens and controls the release of the relay *ma*.

The marker knows the primary section SP16 (relay *cp*16) and the outlet inside this section (relay *bl*1) to which is connected the new selected line (*lg*241). The relays characterizing the inlet of the switching network to which is connected the called line access *le* of the feed-junctor AL1 being still energized, the circuit CS selects a path between the selected line and the feed-junctor. The relay *tz* energizes through the contacts *ma*8, *ta*3, *tb*1. The contact *tz*2 applies a general earth to the selection circuit CS. The circuit CS selects a connection path between the new selected line and the called line access of the feed-junctor AL. If a connection path is available, the operation goes on as above-described until the connection path is established, then the register EN and the marker release.

Meanwhile, the contact *tz*1 opens and breaks the energization circuit of the relay *tt* which holds by the discharge current of capacitor *c*1.

If, again, no connection path is found between the selected line and the feed-junctor AL1, when relay *tt* releases, as the counter CP has only one single relay in the present embodiment and can only register one renewal of line selection, the closure of the contact *tt*6 controls the energization of the relay *li* by the contacts *ti*2, *tt*6 and *tx*3. The contact *li*1 closes and applies an earth on the wire 11 towards the register EN. The register EN then controls the sending of a busy signal towards the calling subscriber, and releases. The relay *cn* releases. The earth of the wire *lk* is removed ; the relay *mg* releases and removes the marker general earth which then releases.

Such a system thus enables the selection of a free line of the called group, then if no connection path is available between the selected line and the feed-junctor, it enables, by means of the circuit CDM, in particular, the selection of another free line of the group. The fact that a selection renewal has been carried out is registered and, of no connection path is free between the new selected line and the feed-junctor, the switching network RC is considered congested and the busy tone is sent to the calling subscriber.

Now will be considered the case when all the lines of the called group are busy. The marker relays *mg*, *tt*, *ts* and *tx* are energized. The number of the called group has been received in the marker MQ ; the relays *bl*1 and *lg* are energized, the contact *bg*2 upon opening has broken the energization circuit of the relay *tt* which nevertheless holds by the discharge current of capacitor *c*1. No line of the called group is free ; therefore, neither the relays *cp*1 to *cp*16 nor the relay *ta* can energize. At the end of a certain time, the relay *tt* releases, when the current supplied by capacitor *c*1 is not sufficient to hold it. The contact *tt*11 opens and the relay *ts* releases.

If the calling station is not a priority one, the relay so is not energized. As the contact *tt*3 closes, the relay *li* energizes through the contacts *tt*3, *ta*7, *ma*9, *so*2 and *tx*3. The opening of the contact *li*5 avoids the energization of the relay *ma*. The contact *li*1 closes and applies an earth on the wire *ll* towards the register EN. The register EN controls the sending of a busy signal towards the calling subscriber and then releases. The relay *cn* releases. The earth of the wire *lk* is removed. The relay *mg* releases and disconnects the marker general earth. The marker releases.

If the calling station is a priority one, the relay *so* is energized. At the closure of the contact *tt*4, the relay *oz* energizes through the contacts *ta 8*, *ma*10, *tt*4, *so*1 and *tx*3 and holds through the contact oz18. The contacts *oz*1/16 operate and route the energization circuits of the relays *cp*1 to *cp*16 into the collectors of the transistors T1 to T16. At the closure of the contact *ts*5, the relay *ma* is energized and holds through the contacts *ma*1, *tx*4 and *ti*7. The contacts ma2 and tz3 establish the feed circuit of the circuit CSI.

At the closure of contact *oz*19, the relay *tt* energizes. The relay ts energizes through the contact *tt*11. The relay *ti* energizes through the contacts *oz*20 and *tt*13 and holds through the contact *ti*3. The contact *ti*7 opens and controls the release of the relay *ma*. The contact *ma*2 opens ; however, the feed circuit of the circuit CSI is held by the contact *ts*2. The contact *ti*6 opens and breaks the energization circuit of the relay *tt* which holds due to the discharge current of capacitor *c*1.

Moreover, the junctors of the busy lines whose busy condition authorizes the connection of a calling line, supply a negative potential on a wire *lt* proper to them towards the marker circuit MA. The relay *bl*1 being energized and the contacts *bl*1.4 to *bl*1.20 being closed, this negative potential is applied to the bases of the transistors T1 to T16, causing the corresponding transistors to conduct. For instance, the line *lg*1 (FIG.1) is in first degree busy condition. The junctor JA1 supplies a negative potential on the wire *lt*. This potential, applied to the base of transistor T1 causes the latter to conduct and tends to energize the relay *cp*1 in the circuit CSI. According to the priority rank given by the circuit CDM to the relays *cp*1 to *cp*16, one single relay among these relays energizes. If the highest priority is given to relay *cp*1, for example, the relay *cp*1 energizes as previously. The relay *ta* also energizes. The contact *ta*1 closes and re-establishes the energization circuit of relay *tt*.

The circuit CDM changes position in order to assign the lowest priority to the relay *cp*1.

As the line *lg*1 has been designated, the marker proceeds to the selection of a connection path between the line *lg*1 and the called line side access of the feed-junctor AL1, as it has already been described, by energizing the relay *tz* and operating the circuit CS (closure of the contact *tz*2). The contact *tz*1 breaks the energization circuit of the relay *tt* which holds by the discharge current of capacitor *c*1. The relay tz then releases when a connection path has been selected. The contact *tz*1 re-establishes the energization of the relay *tt*. The circuit CS controls the connections necessary to the establishment of the selected path, then the relay *fc* energizes. The contact *fc*1 applies an earth on the wire *lf*. The register EN releases and removes the earth from the wire *lk*. The relay *mg* releases and controls the release of the marker MQ.

If there exists no path between the line *lg*1 and the feed-junctor AL1, as the contact *tz*1 is opened, the relay *tt* releases at the end of capacitor *c*1 discharge time. The relay *li* energizes through the contacts *tx*3, *tt*6 and *ti*2. The contact li1 applies an earth on the wire *ll* towards the register EN in order to send the busy tone. The register EN and the marker MQ then release as previously seen.

Moreover, if when a priority station calls, all the lines are in second degree busy condition then junctors do not supply a negative potential on their wires *lt*. None of the relays *cp*1 to *cp*16 can energize. As the relay *ti* is energized and the contact *ti*6 opened, the relay *tt* releases at the end of capacitor *c*1 discharge time. The relay *li* energizes by the contacts *tx*3, *tt*6 and *ti*2. The contact *li*1 applies an earth on the wire *ll*. The calling line is transferred into busy condition. The register EN and the marker MQ release.

Referring to FIG. 4, now will be described an embodiment of the distribution circuit CDM. This circuit is mainly constituted by five relays *xa* to *xe*, whose contacts enable the connection of the input *ent* to anyone of the outputs *st*1 to *st*16 (see FIG. 3).

It will be assumed that initially these 5 relays are at rest. The input *ent* is thus connected to the output *st*1 through the contacts *xa*/*xe*2. Referring to FIG. 3 and to the above-described operation, it can be seen that the circuit CDM gives the priority to the primary section corresponding to the relay *cp*1. If the group of lines above-defined is called and if the line *lg*1 is free, the relay *cp*1 energizes as well as the relay *ta*.

The contact *ta*7 operates. The relay *tc* energizes through the contacts *xa*6/*xd*6, *xe*1 and *ta*7. The contacts *tc*1 and *tc*2 close. The relay *xa* energizes through the contacts *tc*1 and *cp*1.25 and holds through the contacts *xa*1 and *tc*2. The circuit CDM has changed position. The contacts *xa*2 and *xb*3/*xe*3 connect the input *ent* to the output *st*2. This position gives the highest priority to the primary section SP2 (relay *cp*2) and the lowest priority to the primary section SP1 (relay *cp*1). However, the circuit CDM is shortcircuited by the contact *ta*6 (FIG. 3). The changing of position of the circuit CDM has thus no effect upon the marker operation.

Further on, either at the marker release, when the call processing is completed, or at the selection renewal, if no path through the switching network RC is available between the line *lg*1 and the feed-junctor AL1, the relay *ta* releases. The contact *ta*7 returns to rest position. The relay *xa* holds through the contact *ta*7, whereas the relay *tc* releases. The contact *ta*6 (FIG. 3) opens, the circuit CDM is de-shortcircuited.

When a call further on occurs and concerns the same group of lines, the circuit CDM being still in the position *st*2, the line selection is in function of circuit CDM position, as previously described. If only the lines *lg*1 connected to the primary section SP1, *lg*17 connected to the primary section SP2 and *lg*241 connected to the primary section SP16 (see FIG. 2), for example, are free, the relay *cp*2 corresponding to the section SP2, then the relay *ta* energize. The selected line is the line *lg*17. The circuit CDM is shortcircuited (contact *ta*6, FIG. 3). The operation of the contact *ta*7 breaks the holding circuit of the relay *xa* which restores to normal. The relay *xa* releases. The contact *xa*6 closes. The relay *tc* energizes again. The contacts *tc*1 and *tc*2 close. The relay *xb* energizes by the contacts *cp*2.25 and *tc*1 and holds through the contacts *xb*1 and *tc*2. The contacts *xa*2, *xb*2, *xc*4, *xd*4 and *xe*4 connect the input *ent* to the output *st*3. The distributor changes position and gives the highest priority to the primary section SP3 and the lowest to the primary section SP2.

When the relay *ta* releases, the relay *xb* holds through the contact *ta*7. The relay *tc* releases.

The operation is identical for the 16 positions of the distribution circuit CDM ; this operation is summarized by the following table in which ; the column "Inlet" indicates the reference of the primary section relay controlling the positioning of circuit CDM ; the column "CDM position" contains, on the one hand, the reference of the operated relays of circuit CDM, and, on the other hand the reference of the output to which is connected the input *ent* ; the column "Priority" indicates the reference of the primary section relay to which is further given the highest priority rank.

| Input | CDM Position | Priority | Input | CDM Position | Priority |
|---|---|---|---|---|---|
| *cp*1 | *xa* | *st*2 *cp*2 | *cp*9 | *xa*,*xe* | *st*10 *cp*10 |
| *cp*2 | *xb* | *st*3 *cp*3 | *cp*10 | *xb*,*xc* | *st*11 *cp*11 |
| *cp*3 | *xc* | *st*4 *cp*4 | *cp*11 | *xb*,*xd* | *st*12 *cp*12 |
| *cp*4 | *xd* | *st*5 *cp*5 | *cp*12 | *xb*,*xe* | *st*13 *cp*13 |
| *cp*5 | *xe* | *st*6 *cp*6 | *cp*13 | *xc*,*xd* | *st*14 *cp*14 |
| *cp*6 | *xa*,*xb* | *st*7 *cp*7 | *cp*14 | *xc*,*xe* | *st*15 *cp*15 |
| *cp*7 | *xa*,*xc* | *st*8 *cp*8 | *cp*15 | *xd*,*xe* | *st*16 *cp*16 |
| *cp*8 | *xa*,*xd* | *st*9 *cp*9 | *cp*16 | — | *st*1 *cp*1 |

It can thus be seen that a primary section relay controls the position of circuit CDM in order that the latter gives the highest priority to the next primary section relay.

It is clearly understood that the preceding description has only been given as an unrestrictive example and that numerous alternatives may be considered without departing from the scope of the invention. In particular, all numerical precisious have been given only to facilitate the description and may change with each application.

We claim:

1. An automatic telecommunications switching system including switching network, a plurality of lines each connected to an outlet of the switching network, said outlets being grouped into a plurality of multiple outlet sections, certain of said lines being grouped under a common call number grouping assigned to the group, a plurality of inlets to said network, common control equipment connected to the inlets of the switching network, the invention comprising an identification circuit for identifying an available line of a called group for selection, means for selecting an identified line for attempting the completion of a connection path thereto, a priority control circuit responsive to selections for according identification priorities for selection, said priority control circuit responsive to selection of a line in one outlet section for according said section the lowest priority for subsequent selections, time delay means responsive to start of an attempt to complete a connection path to an identified and selected line for initiating a timed period, selection renewal means responsive to the termination of the delay period without a connection having been made for cancelling the prior identification and selection and for selecting another section having lines from the called group, and means responsive to a plurality of failures to complete a connection for returning a busy signal from the called group.

2. A system as claimed in claim 1, wherein there is a counting means which counts attempts at completing a path, and means responsive to a predetermined count having been reached by said counting means for terminating further attempts.

3. System as claimed in claim 1, wherein the switching network includes at least one primary selection stage made up of several sections constituted by multiswitches whose outlets are multipled between them and to which are connected the lines, and wherein various lines of a line group are connected to the same rank outlets of different sections which makes it possible to select and identify simply a line of a group by selecting and identifying the primary section to which it is connected.

4. System as claimed in claim 1, wherein said identification means includes cut-in means responsive to a first condition at a line having initiated a call to a group and operative when no line of the called group is available, for selecting and connecting to a busy line of said group.

5. System as claimed in claim 1 further including busy condition delay means operative when the lines of a group are identified and measuring the time devoted to the choice of an available line; and means operative to when no line is chosen at the end of this time, switch the identification circuit for cut-in.

* * * * *